United States Patent [19]

Keating

[11] Patent Number: 5,150,321

[45] Date of Patent: Sep. 22, 1992

[54] APPARATUS FOR PERFORMING SERIAL BINARY MULTIPLICATION

[75] Inventor: Patrick N. Keating, Ellicott City, Md.

[73] Assignee: Allied-Signal Inc., Morris Township, Morris County, N.J.

[21] Appl. No.: 632,691

[22] Filed: Dec. 24, 1990

[51] Int. Cl.$^5$ .............................................. G06F 7/52
[52] U.S. Cl. ...................................... 364/759; 364/757
[58] Field of Search ....................... 364/759, 757, 746.2

[56] References Cited

U.S. PATENT DOCUMENTS

| | | | |
|---|---|---|---|
| 3,115,574 | 12/1963 | Paul et al. | 235/164 |
| 3,515,344 | 6/1970 | Goldschmidt et al. | 235/175 |
| 3,805,045 | 4/1974 | Larsen | 235/175 |
| 3,840,727 | 10/1974 | Amdahl et al. | 235/164 |
| 4,054,788 | 10/1977 | Maitland et al. | 364/786 |
| 4,228,518 | 10/1980 | Chamberlin | 364/759 |
| 4,228,520 | 10/1980 | Letteney et al. | 364/760 |
| 4,538,239 | 8/1985 | Magar | 364/759 |
| 4,638,449 | 1/1987 | Frey | 364/760 |
| 4,839,847 | 6/1989 | Laprade | 364/754 |
| 4,868,777 | 9/1989 | Nishiyama et al | 364/754 |
| 4,901,270 | 2/1990 | Galbi et al. | 364/759 |
| 4,994,497 | 2/1991 | Martin et al. | 364/759 |
| 5,025,408 | 6/1991 | Sherman | 364/759 |

OTHER PUBLICATIONS

Algirdas Avizienis, Signed-Digit Numbe Representations for Fast Parallel Arithmetic, IRE Transactions on Electronic Computers, pp. 389-400, Sep. 1961.

Milos D. Ercegovac, On-Line Arithmetic: An Overview; SPIE vol. 495 Real Time Signal Processing VII, pp. 86-93, 1984.

Ercegovac an Lang, On-the-Fly Conversion of Redundant into Conventional Representations, IEEE Transactions on Computers vol. C-36, No. 7, pp. 895-897, Jul. 1987.

Mary J. Irwin, An Arithmetic Unit for On-Line Computation pp. IV-146 1990, UMI Dissertation Information Service, Ann Arbor, Mich.

Primary Examiner—David H. Malzahn
Attorney, Agent, or Firm—Christopher N. Malvone; Howard G. Massung; Robert A. Walsh

[57] ABSTRACT

A serial binary multiplier receives a multiplicand and a multiplier, and produces a product. The multiplicand is received in a serial format beginning with a most significant bit and ending with a least significant bit. The multiplier is received in a parallel format, and the product is available in both serial and parallel formats. The multiplier consists of a multiples generator, an arithmetic unit, and a decoder. The multiples generator generates a multiple of the multiplicand for each bit of the multiplier that is equal to logic one. The multiples generator produces the multiples in a serial format beginning with a most significant bit and ending with a least significant bit. The arithmetic unit serially receives the multiples produced by the multiples generator, and produces the sum of the multiples. The sum is produced in the form of two serial binary numbers which compose an unsigned redundant binary number. The decoder receives the unsigned redundant binary number produced by the arithmetic unit. The decoder converts the unsigned redundant binary number into a conventional binary number which represents the product of the multiplicand and the multiplier. The product is available in a parallel format, and in a serial format beginning with a most significant bit and ending with a least significant bit.

13 Claims, 4 Drawing Sheets

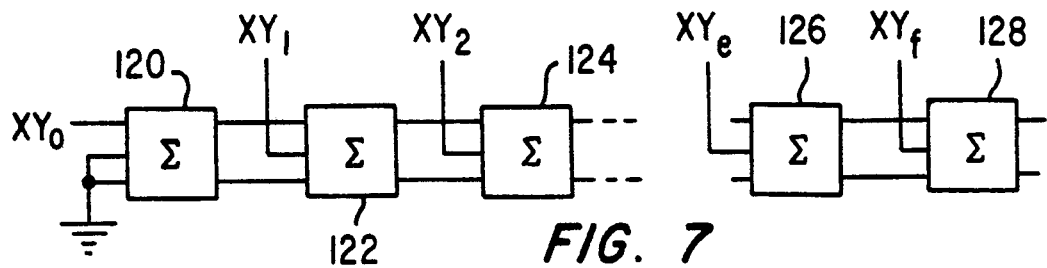
FIG. 7
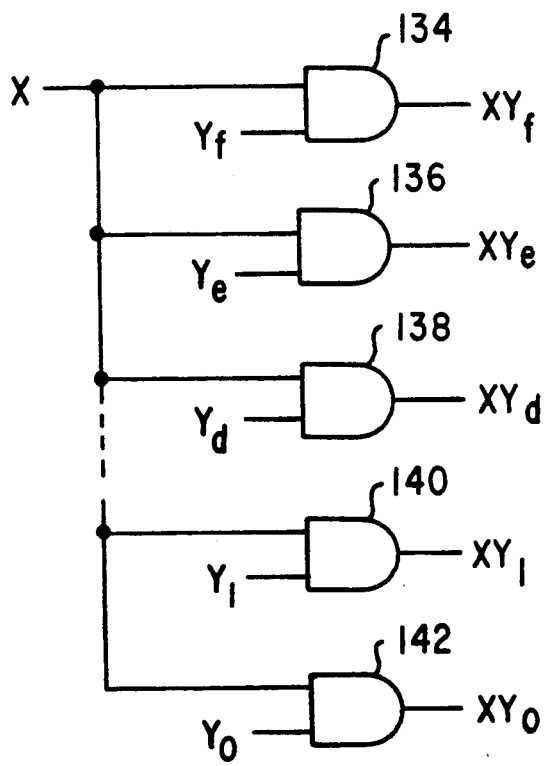
FIG. 8
| x | y | z | $S_{n+1}$ | $r_n$ |
|---|---|---|---|---|
| $s_A$ | $s_B$ | $r_B$ | | |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |
FIG. 9

APPARATUS FOR PERFORMING SERIAL BINARY MULTIPLICATION

CROSS-REFERENCE TO RELATED APPLICATIONS

This application is related to the following copending, commonly assigned U.S. patent application: U.S. Ser. No. 07/632,726 of Patrick N. Keating entitled "An Apparatus and Method For Performing Serial Binary Arithmetic" filed on Dec. 24, 1990.

BACKGROUND OF THE INVENTION

1. Field of the Invention

The present invention relates to performing serial binary arithmetic from most significant bit to least significant bit. The binary arithmetic includes addition, subtraction, and multiplication.

2. Description of the Related Art

In the past, arithmetic operations such as multiplication were performed on two parallel binary numbers to produce a parallel output. This type of multiplication has several disadvantages. One disadvantage is that the amount of hardware increases as the square of the number of bits in the words being multiplied. In addition, parallel multiplication does not take advantage of the most significant bit (MSB) to least significant bit (LSB) ordering that occurs in most sorting operations, and in successive approximation analog to digital converters.

Serial arithmetic operations resolve the aforementioned short comings of parallel multiplication. In serial multiplication numbers are multiplied using inputs which are received from MSB to LSB. One advantage offered by this arrangement is that the amount of circuitry increases linearly with the number of bits in the input words, rather than as the square of the number of bits. In addition, serial arithmetic takes advantage of the MSB to LSB ordering used in most sorting operations, and in successive approximation analog to digital converters. Serial operations also facilitate pipelining by overlapping operations. For example, the most significant bit of a first arithmetic operation can be received by a second arithmetic operation without waiting for the first operation to produce less significant bits.

Since serial arithmetic operations produce the MSB before producing the LSB, the final value of the most significant bits may not be known until the last pair of least significant bits have been received at an input. This characteristic of serial arithmetic requires representing an interim result in a redundant manner. A redundant result P, which uses a signed digit representation, can be expressed as:

$$P = \sum_{i=1}^{m} P_i 2^{-i} \quad P_i \in \{-1, 0, 1\}$$

The interim result is then converted into an ordinary binary number to produce a final result.

A signed digit representation is disclosed in existing works such as "On-Line Arithmetic: An Overview", M. D. Ercegovac, SPIE Vol. 495 Real Time Signal Processing VII, pp 86-93, 1984; "On-The-Fly Conversion of Redundant into Conventional Representations", M. D. Ercegovac and T. Lang, IEEE Transactions on Computers, Vol. C-36, No. 7, pp 895-897, July 1987; "Signed-Digit Number Representations for Fast Parallel Arithmetic", A. Avizienis, IRE Transactions on Electronic Computers, Vol. EC-10, pp 389-400, Sept. 1961. The contents of said existing works are hereby incorporated by reference. By employing a signed digit representation, the existing works require complex hardware that performs both addition and subtraction.

SUMMARY OF THE INVENTION

The problems of the aforementioned arithmetic operations are solved by the present invention wherein, a plurality of multiplies of a serial input binary number are serially generated in response to a parallel input binary number, a combining circuit serially adds, from a MSB to a LSB, the plurality of multiples to produce an unsigned redundant binary number consisting of two ordinary binary sequences, and a decoding circuit serially converts, from a MSB to a LSB, the unsigned redundant binary number into a conventional binary number.

The present invention avoids the short comings of parallel multiplication by performing serial arithmetic. In addition, it overcomes the disadvantage of using the signed digit representation seen in existing serial arithmetic techniques. The present invention uses two ordinary binary sequences to represent a redundant result. By avoiding the use of a signed digit representation, the present invention does not require hardware that can perform both subtraction and addition, and therefore can be implemented with less complicated hardware.

The present invention's simpler structure facilitates the use of advanced technologies such as GaAs. In addition, the simpler structure supports highly local interconnectivity which permits running the circuitry at high speed.

BRIEF DESCRIPTION OF THE DRAWINGS

FIG. 7 is a block diagram of the arithmetic unit using three input adders in a pipeline architecture.

FIG. 8 is a logic diagram of the multiples generator that is used with the arithmetic unit of FIG. 7.

FIG. 9 is a truth table.

DESCRIPTION OF THE PREFERRED EMBODIMENT

The present invention multiplies a multiplicand by a multiplier to produce a product Multiples of the multiplicand are generated based on the value of the multiplier. The multiples of the multiplicand are then added to produce an interim result which is in the form of an unsigned redundant binary number The interim result is converted into a conventional binary number which is equal to the product of the multiplicand and the multiplier.

Figure 1:
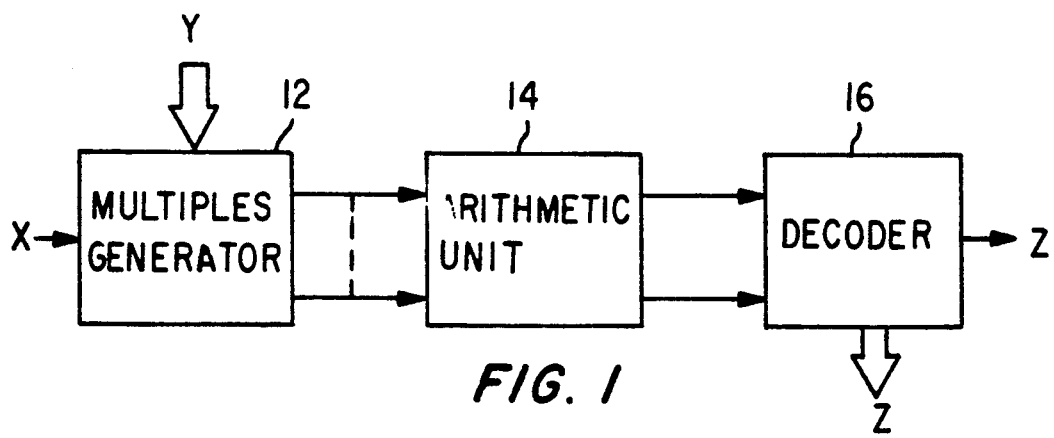
FIG. 1 is a block diagram of the invention showing the multiples generator, the arithmetic unit, and the decoder.

FIG. 1 illustrates the overall architecture of the present invention. The three principle components are multiples generator 12, arithmetic unit 14, and decoder 16.

Multiples generator 12 receives as its inputs multiplier Y and multiplicand X. The multiplier is received by a parallel input, and the multiplicand is received by a serial input. Multiples generator 12 generates one multiple of multiplicand X for each bit of multiplier Y that has a value of logic 1. The multiples are generated starting with the MSB and ending with the LSB. The multiples are serially feed to arithmetic unit 14 starting with the MSB.

Arithmetic unit 14 receives the multiples from multiples generator 12 over a plurality of serial inputs Arithmetic unit 14 serially adds the multiples from MSB to LSB. The resulting sum is an interim result which represents the product of the multiplicand and the multiplier. This interim result is in the form of an unsigned redundant binary number. This redundant format consists of two serial binary numbers or binary sequences which are produced beginning with the MSB and concluding with the LSB The two binary sequences can be thought of as a sequence of sum bits and a sequence of carry bits; this interim product is serially fed to decoder 16 beginning with the MSB.

Decoder 16 converts the interim product from arithmetic unit 14 into a conventional binary number. The decoder serially combines, from MSB to LSB, the two binary sequences which redundantly represent the interim product. The product of the multiplicand and multiplier is available from decoder 16 on a serial output, and on a parallel output.

Multiples generator 12 generates serial binary numbers which are multiples of the multiplicand. A multiple is generated for each bit of the multiplier that has a value of logic 1. Each multiple represents the multiplicand multiplied by $2^N$, where N is equal to the power of 2 represented by a bit of the multiplier. For example, if the MSB of the multiplier represents $2^4$, and if that bit is equal to logic 1, a multiple will be generated which represents the multiplicand multiplied by $2^4$. If the next bit of the multiplier represents $2^3$, and if that bit is equal to logic 0, no multiple will be generated in response to that bit of the multiplier. If the next bit of the multiplier represents $2^2$, and if that bit is equal to logic 1, a multiple of the multiplicand will be generated which represents the multiplicand multiplied by $2^2$. This type of operation is carried out in response to each bit of the multiplier until a multiple of the multiplicand is generated for each bit of the multiplier that has a value of logic 1.

Figure 2:
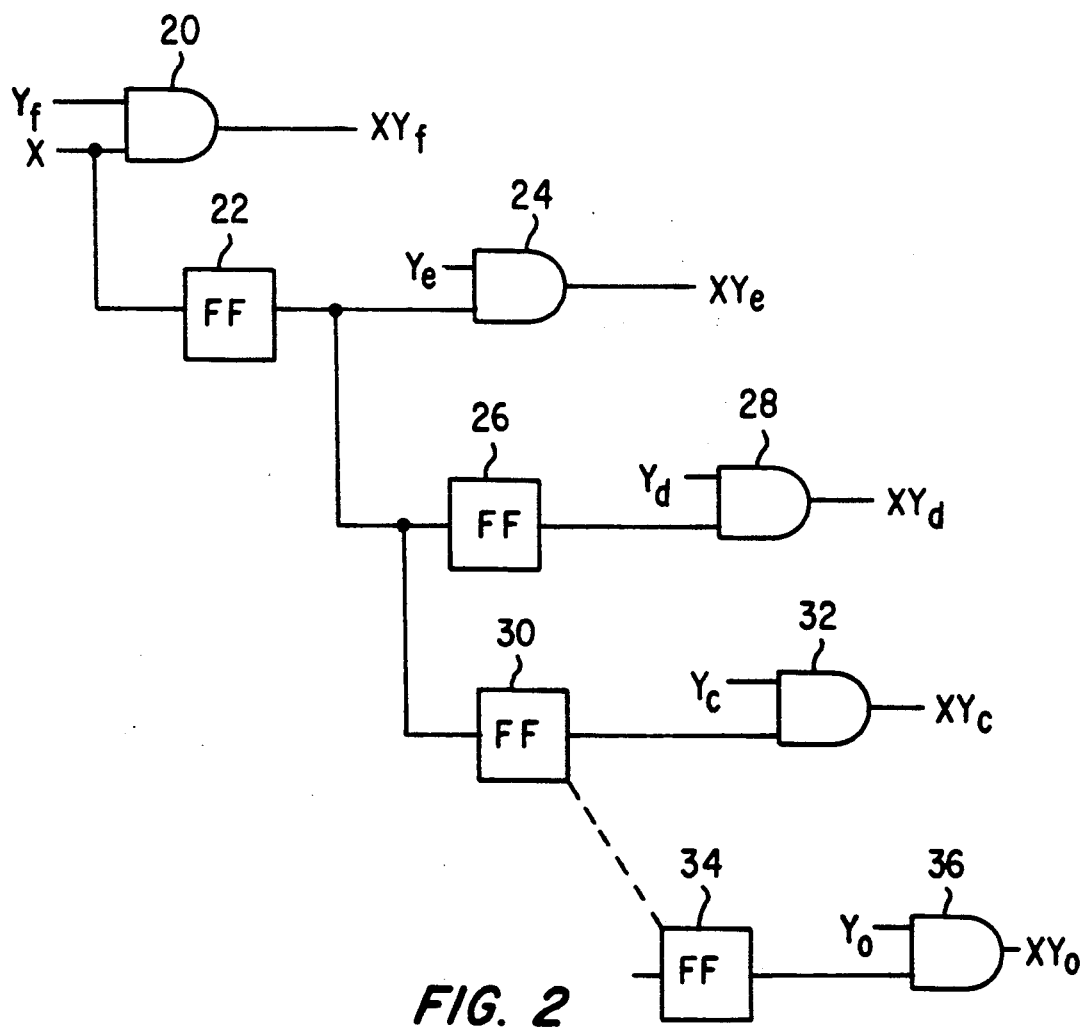
FIG. 2 is a logic diagram of the multiples generator.

FIG. 2 is a detailed logic diagram of multiples generator 12. The multiplicand is represented by the variable X and is serially fed into multiples generator 12 beginning with the MSB and ending with the LSB. It should be noted that the multiplicand can be received in a parallel format and then converted to a serial format through the use of a shift register. The multiplier is received in a parallel format and is represent by the variable Y. Each bit of the multiplier is designated by the variable Y with a subscript. In this example, the subscripts have the hexadecimal values f through 0 with f corresponding to the MSB and 0 corresponding to the LSB.

Multiples generator 12 is comprised of logic units and delay units. For an N bit wide multiplier, there are N logic units and N−1 delay units. Each of the logic units serially receive the multiplicand on a first input after the multiplicand has been delayed by an amount that can range from 0 through N−1 clock periods. The logic units also receive one bit of the multiplier on a second input. Each of the logic units produce a multiple of the multiplicand when the multiplier bit on its second input is equal to logic 1. The logic unit that receives the MSB of the multiplier on its second input, receives the multiplicand with a delay of 0 on its first input. The logic unit that receives the second most significant bit of the multiplier on its second input, receives the multiplicand with a delay of one clock period on its first input. The logic unit that receives the third most significant bit of the multiplier on its second input, receives the multiplicand with a delay of two clock periods on its first input. This type of arrangement continues for each of the logic units until the logic unit that receives the LSB of the multiplier on its second input, receives the multiplicand with a delay of N−1 clock periods on its first input.

A first input of AND gate 20 serially receives the multiplicand. A second input of AND gate 20 receives the MSB of the multiplier which is labeled $Y_f$. When $Y_f$ is equal to logic 1, gate 20 generates a multiple of the multiplicand labeled $XY_f$. The multiplicand is also serially fed into D flip-flop 22 which delays the multiplicand by one clock period. The output of D flip-flop 22 is fed to a first input of AND gate 24. A second input of AND gate 24 receives the second most significant bit of the multiplier which is labeled $Y_e$. When the value of $Y_e$ is equal to logic 1, the output of AND gate 24 is a multiple of the multiplicand labeled $XY_e$. The output of D flip-flop 22 is also fed into the input of D flip-flop 26 where it is delayed by another clock period. The output of D flip-flop 26 is connected to a first input of AND gate 28. A second input of AND gate 28 receives the third most significant bit of the multiplier which is labeled $Y_d$. When $Y_d$ is equal to logic 1, AND gate 28 generates a multiple of the multiplicand labeled $XY_d$. The output of D flip-flop 26 is also fed into the input of D flip-flop 30 where it is delayed yet another clock period. The output of D flip-flop 30 is fed into a first input of AND gate 32. A second input of AND gate 32 receives the forth most significant bit of the multiplier which is labeled $Y_c$. When $Y_c$ is equal to logic 1, AND gate 32 generates a multiple of the multiplicand labeled $XY_c$. This same type of structure continues for each bit of the multiplier until D flip-flop 34 receives its input from the output of a D flip-flop which is associated with the second least significant bit of the multiplier. The output of D flip-flop 34 is fed into a first input of AND gate 36. A second input of AND gate 36 receives the least significant bit of the multiplier labeled $Y_0$. When the least significant bit of the multiplier is equal to logic 1, the output of AND gate 36 is equal to a multiple of the multiplicand labeled $XY_0$.

The multiples, $XY_f$ through $XY_0$, are serially generated and are skewed in time with respect to each other. For example, a multiple generated in response to a multiplier bit $Y_n$ will be delayed by one clock period with respect to a multiple generated in response to a multiplier bit $Y_{n+1}$, where bit $Y_n$ has a value of $2^N$ and bit $Y_{n+1}$ has a value of $2^{N+1}$. As a result of this time skew, the multiple $XY_f$ is equal to two times multiple $XY_e$, and multiple $XY_e$ is equal to two times multiple $XY_d$, and so on until multiple $XY_1$ is equal to two times multiple $XY_0$.

The multiples $XY_f$ through $XY_0$ are added together in arithmetic unit 14. Arithmetic unit 14 serially adds from MSB to LSB, all of the multiples generated by multiples generator 12. The output produced by arithmetic unit 14 is an interim result represented by an unsigned redundant binary number. The redundant binary number is in the form of two binary sequences which start with an MSB and end with an LSB.

Figure 3:
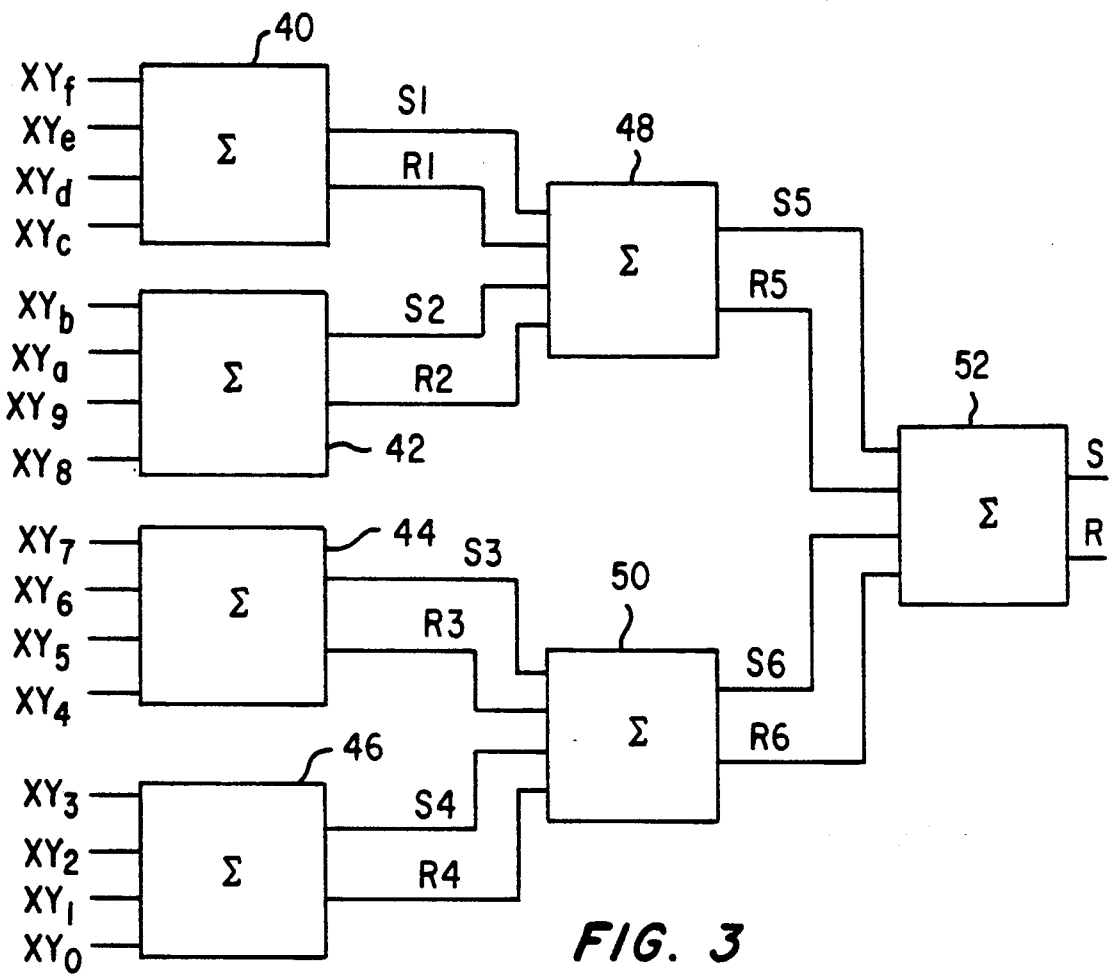
FIG. 3 is a block diagram of the arithmetic unit using a tree architecture.

FIG. 3 is a block diagram of arithmetic unit 14 using a tree architecture comprising a plurality of four input adders. Each four input adder receives four serial binary numbers or binary sequences from MSB to LSB, and produces a sum which is represented by an unsigned redundant binary number in the form of two output serial binary numbers or binary sequences.

FIG. 3 illustrates a three layer structure. Four input adders 40, 42, 44, and 46 compose the first layer, and each adder serially receives four multiples from multiples generator 12. Adder 40 serially adds multiples $XY_f$ through $XY_c$, and produces output sequences S1 and R1 which redundantly represent the sum of multiples $XY_f$ through $XY_c$. Adder 42 serially adds multiples $XY_b$ through $XY_8$, and produces sequences S2 and R2 which redundantly represent the sum of multiples $XY_b$ through $XY_8$. Adder 44 serially adds multiples $XY_7$ through $XY_4$, and produces sequences S3 and R3 which redundantly represent the sum of multiples $XY_7$ through $XY_4$. Adder 46 serially adds multiples $XY_3$ through $XY_0$, and produces sequences S4 and R4 which redundantly represent the sum of multiples $XY_3$ through $XY_0$.

The second layer of arithmetic unit 14 comprises four input adders 48 and 50. Adders 48 and 50 receive the binary sequences which were produced by adders 40, 42, 44, and 46. Adder 48 serially adds binary sequences S1, R1, S2, and R2, and produces binary sequences S5 and R5 which redundantly represent the sum of binary sequences S1, R1, S2, and R2. Adder 50 serially adds binary sequences S3, R3, S4, and R4, and produces binary sequences S6 and R6 which redundantly represent the sum of binary sequence S3, R3, S4, and R4.

The third layer of arithmetic unit 14 is comprised of four input adder 52. Adder 52 serially adds the binary sequences which were produced by adders 48 and 50. Adder 52 produces binary sequences S and R which redundantly represent the sum of binary sequences S5, R5, S6, and R6.

Binary sequences S and R compose an unsigned redundant representation of the sum of multiples $XY_f$ through $XY_0$, and thereby form an interium result which represents the product of multiplicand X and multiplier Y.

Arithmetic unit 14 can be comprised of more or less than three layers The first layer should contain a sufficient number of four input adders to receive all of the multiples generated by multiples generator 12. Subsequent layers should have a sufficient number of four input adders to receive all of the sequences produced by the prior layer of adders. This process should continue until only two sequences remain. The unused inputs to any of the four input adders can be tied to logic 0.

Figure 4:
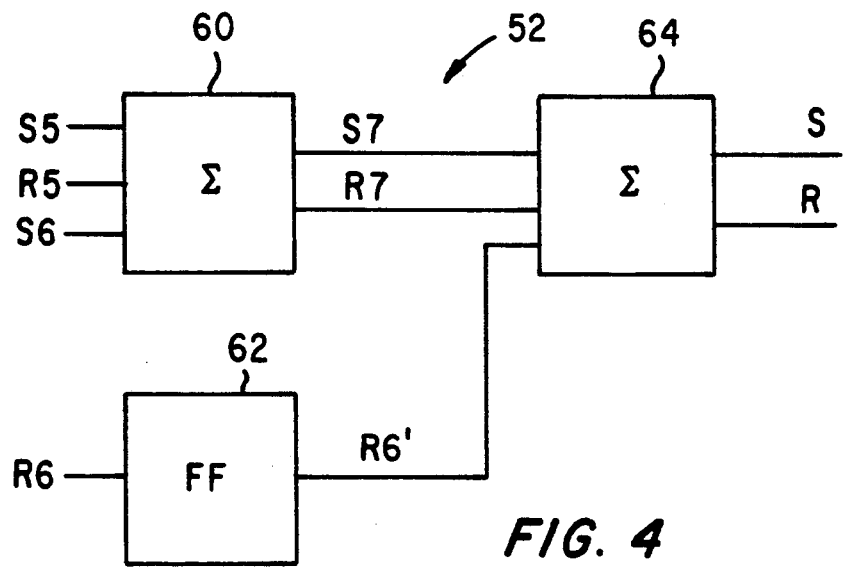
FIG. 4 is a block diagram of a four input adder.

FIG. 4 is a block diagram of a four input adder using three input adders as building blocks The four input adder receives four serial inputs, from MSB to LSB, and produces a sum in the form of an unsigned redundant binary number represented by binary sequences S and R. The three serial inputs S5, R5, and S6 are received by three input adder 60, and the forth serial input, R6, is received by D flip-flop 62. Three input adder 60 produces output sequences S7 and R7 which redundantly represent the sum of input sequences S5, R5, and S6. Sequences S7 and R7 are received by two of the three inputs of three input adder 64. Serial input R6 is delayed one clock period by D flip-flop 62. The output of D flip-flop 62 is sequence R6 . Sequence R6' is received by the remaining input of three input adder 64. Three input adder 64 produces output sequences S and R which redundantly represent the sum of sequences S7, R7, and R6'. Three input adders 60 and 64, and D flip-flop 62, are used to construct a four input adder which adds sequences S5, R5, S6, and R6 to produce a sum in the form of an unsigned redundant number composed of sequences S and R.

A four input adder can also be used for subtraction. An unsigned redundant binary number, represented by sequences S6 and R6, can be subtracted from another unsigned redundant binary number represented by sequences S5 and R5. This is accomplished by taking the two's compliment of sequences S6 and R6, and then adding them to sequences S5 and R5 in the four input adder. The output of the four input adder is the difference between the two unsigned redundant binary numbers A three input adder is used to obtain the two's compliment by inverting sequences S6 and R6, and then feeding them into two of the inputs of the three input adder. The third input of the three input adder is kept equal to logic 0 except at the second least significant bit position, at that time, the third input is made equal to logic 1. The resulting outputs from the three input adder are the two's compliment of sequences S6 and R6.

Figure 5:
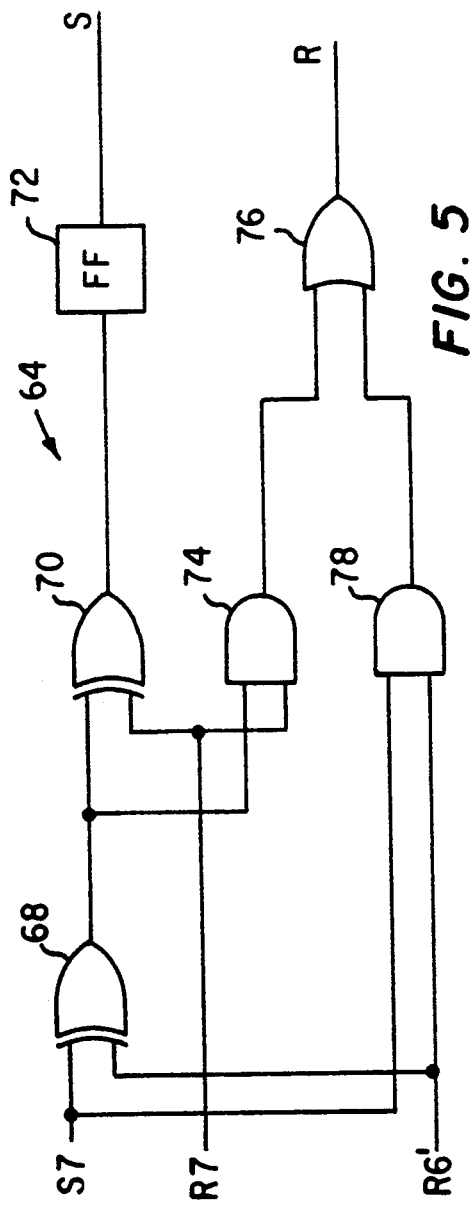
FIG. 5 is a logic diagram of a three input adder.

FIG. 5 is a logic diagram of a three input adder. A three input adder serially receives, from MSB to LSB, three input binary sequences and then produces two binary sequences which redundantly represent the sum of the three input binary sequences. The two binary sequences are produced by performing logic operations on the time aligned or corresponding bits of the three input sequences. The logic operations determine when the sum of corresponding bits equals an odd number, and when at least two of the corresponding bits equal logic 1.

The three input adder receives serial inputs or sequences S7, R7, and R6', and produces output sequences S and R. An EXCLUSIVE OR gate 68 receives sequences S7 and R6', and produces an output which is fed into a first input of EXCLUSIVE OR gate 70. A second input of EXCLUSIVE OR gate 70 receives sequence R7. The output of EXCLUSIVE OR gate 70 is fed into D flip-flop 72 where it is delayed by one clock period The output of D flip-flop 72 is sequence S. A first input of AND gate 74 receives the output of EXCLUSIVE OR gate 68, and a second input of AND gate 74 receives sequence R7. The output of AND gate 74 is received by a first input of OR gate 76. A first input of AND gate 78 receives sequence S7, and a second input of AND gate 78 receives sequence R6'. The output of AND gate 78 is received by a second input of OR gate 76. The output of OR gate 76 is sequence R. Sequences S and R compose an unsigned redundant binary number which represents the sum of input sequences S7, R7, and R6'.

Referring back to FIG. 3, the output of the four input adder 52 is comprised of sequences S and R. These sequences represent the sum of all the multiples of multiplicand X which were generator by multiples generator 12. Sequences S and R are an interim result in the form of an unsigned redundant binary number which is equal to the product of multiplicand X and multiplier Y.

Sequences S and R are received by decoder or converter 16. Decoder 16 converts the product, which is an unsigned redundant format, into an ordinary or conventional binary sequence. The product, which has been converted into an ordinary binary sequence is available in both parallel and serial form.

Figure 6:
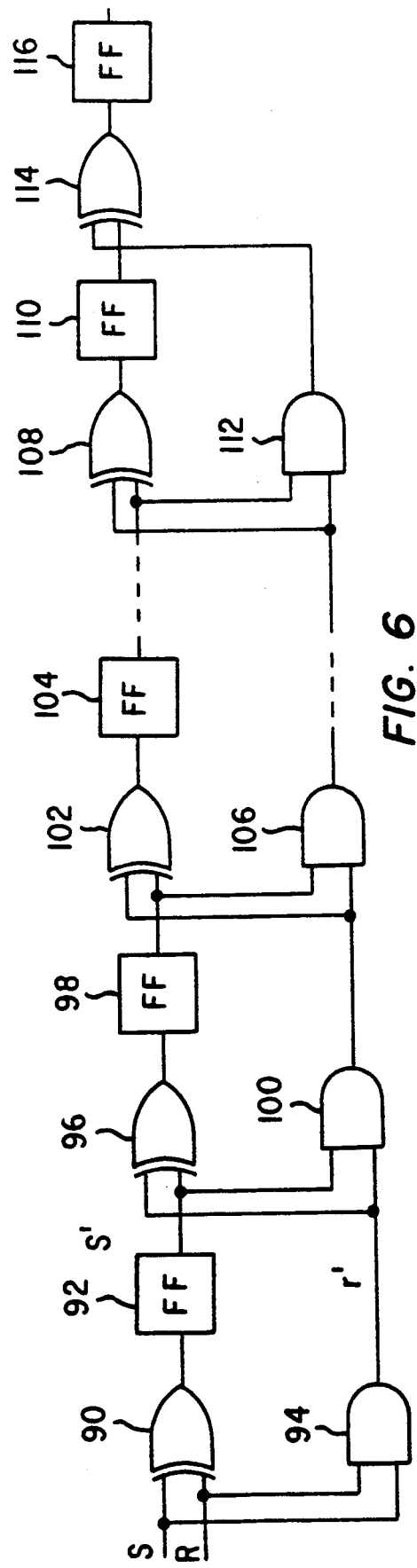
FIG. 6 is a logic diagram of the decoder.

FIG. 6 is a logic diagram of decoder 16. The decoder is comprised of several stages where each stage includes an AND gate, an EXCLUSIVE OR gate, and a D flip-flop.

An EXCLUSIVE OR gate 90 receives sequences S and R from arithmetic unit 14. The output of EXCLUSIVE OR gate 90 is fed to the input of D flip-flop 92 where it is delayed by one clock period. Sequences S and R are also fed to the inputs of AND gate 94. The outputs from D flip-flop 92, and AND gate 94 are fed to the next stage of decoder 16. The output of D flip-flop 92 is fed to a first input of EXCLUSIVE OR gate 96, and the output of AND gate 94 is fed to a second input of EXCLUSIVE OR gate 96. The output of EXCLUSIVE OR gate 96 is fed to the input of D flip-flop 98 where it is delayed by one clock period. The output of D flip-flop 92, and the output of AND gate 94 are also fed to the inputs of AND gate 100. The outputs of D flip-flop 98, and AND gate 100 are used as inputs for the next stage of decoder 16. The output of D flip-flop 98, and the output of AND gate 100 are fed to the inputs of EXCLUSIVE OR gate 102. The output of EXCLUSIVE OR gate 102 is fed to the input of D flip-flop 104 where it is delayed by one clock period. The output of D flip-flop 98, and the output of AND gate 100 are fed to the inputs of AND gate 106. As with the previous stages, the output of D flip-flop 104, and the output of AND gate 106 are used as inputs for the next stage of the decoder. This type of arrangement continues until the desired number of stages are interconnected.

The final two stages of the decoder are comprised of two EXCLUSIVE OR gates, one AND gate, and two D flip-flops. An EXCLUSIVE OR gate 108 receives the output from the D flip-flop of the prior stage on a first input, and receives the output of the AND gate from the prior stage on a second input. The output of EXCLUSIVE OR gate 108 is received by D flip-flop 110 where it is delayed by one clock period. An AND gate 112 receives the output from the D flip-flop of the previous stage on a first input, and receives the output from the AND gate of the previous stage on a second input. The outputs from D flip-flop 110, and AND gate 112 compose the outputs of the second to last stage of the decoder and are received by EXCLUSIVE OR gate 114. The output of EXCLUSIVE OR gate 114 is received by D flip-flop 116 where it is delayed by one clock period. The output of D flip-flop 116 produces the product of multiplicand X and multiplier Y. The product is in the form of a conventional binary number which is serially available at the output of D flip-flop 116 starting with the MSB and ending with the LSB. If it is desirable to receive the product in a parallel format, it can be obtained by parallel loading the outputs of each D flip-flop into a register when the MSB of the product is available at the output of D flip-flop 116.

The number of stages required in decoder 16 depends on the number of bits of accuracy which are required in the product. For example, a 10 stage decoder is required when the application requires a product with an accuracy of 10 bits. If the decoder has more than 10 stages, the 10 bit product can be received serially from the output of the D flip-flop of the tenth stage of the decoder. The ten bit product can be obtain in a parallel format by parallel loading a register with the outputs of the first ten D flip-flops of the decoder. The parallel load should be executed when the MSB of the product is available at the output of the tenth D flip-flop.

The decoder can be comprised of as many stages as is required, but exceeding M+N stages does not increase the accuracy where M is the number of bits in the multiplicand and N is the number of bits in the multiplier.

Referring back to FIG. 3, arithmetic unit 14 has been described as being constructed using a tree architecture. Arithmetic unit 14 may also be constructed using a pipeline architecture. As in the tree architecture, the pipeline architecture arithmetic unit serially adds the multiplies of the multiplicand to produce an interim result which is equal to the sum of the multiplies of the multiplicand. The interim result is in the form of an unsigned redundant number which is comprised of two binary sequences.

FIG. 7 is a block diagram of arithmetic unit 14 using a pipeline architecture. The pipeline architecture involves serially connecting a plurality of three input adders. Each three input adder receives the two binary sequences produced by the preceding three input adder. In addition, each three input adder simultaneously receives a multiple of the multiplicand on its third input. The number of three input adders should at a minimum be equal to the number of bits in the multiplier. Binary sequences S and R are available at the output of the last three input adder. As discussed above, sequences S and R compose an interim result which is in the form of an unsigned redundant binary number.

Three input adder 120 comprises the first stage of the pipeline, and receives multiple $XY_0$ which was produced in response to the LSB of the multiplier. Since adder 120 is the first adder of the pipeline, only one input is used and the remaining two inputs are tied to logic 0. The two serial outputs of adder 120 are received by two of the inputs of three input adder 122. The remaining input of adder 122 receives multiple $XY_1$ which was produced in response the second least significant bit of the multiplier. The two outputs of adder 122 are received by two of the inputs of three input adder 124. The third input of adder 124 receives multiple $XY_2$ which was produced in response to the third least significant bit of the multiplier. This type of structure continues and terminates in the final stages of the pipeline where three input adder 126 receives the outputs of the previous three input adder on two of its inputs. The third input of adder 126 receives multiple $XY_e$ which was generated in response to the second most significant bit of the multiplier. The two outputs of adder 126 are received by two of the inputs of adder 128. The remaining input of adder 128 receives multiple $XY_f$ which was generated in response to the most significant bit of the multiplier. The outputs of adder 128 are sequences S and R. These sequences are an interium result in the form of an unsigned redundant binary number which is equal to the product of multiplicand X and multiplier Y.

A simplified multiples generator is used with the pipelined arithmetic unit. Referring back to FIG. 2, a simplified multiples generator is constructed by eliminating the D flip-flops which introduce a one clock period delay between each of the multiples. As a result, the multiples are produced without a time skew, and therefore do not have the proper relative values. Referring back to FIG. 7, the proper time skew is introduced by the pipelined arithmetic unit. Each multiple from the simplified multiples generator is received by a three input adder. The adder's position in the pipeline provides the proper time alignment of the multiples. A multiple received by adder stage N will have a one clock period delay with respect to a multiple received by adder stage N+1. As a result of this time skew, the proper relative values of the multiples are obtained. For example, multiple $XY_0$ will have a one clock period delay with respect to multiple $XY_1$, and multiple $XY_1$, will have a one clock period delay with respect to $XY_2$; therefore, multiple $XY_2$ will equal two times multiple $XY_1$, and multiple $XY_1$ will equal two times multiple $XY_0$.

FIG. 8 is a logic diagram of a simplified multiples generator. Multiplicand X is serially fed to a first input of a plurality of two input AND gates. The second input of each AND gate is connected to one bit of the multiplier. The output of each AND gate produces a multiple of the multiplicand when the value of the gate's second input is equal to logic 1.

A first input of AND gate 134 serially receives multiplicand X, and a second input receives the MSB of the multiplier which is labeled $Y_f$. The output of AND gate 134 produces multiple $XY_f$ when the value of $Y_f$ is equal to logic 1. A first input of AND gate 136 receives multiplicand X, and a second input receives the second most significant bit of the multiplier which is labeled $Y_e$. The output of AND gate 136 produces multiple $XY_e$ when bit $Y_e$ is equal to logic 1. Likewise, a first input of AND gate 138 receives multiplicand X, and a second input receives the third most significant bit of the multiplier which is labeled $Y_d$. The output of AND gate 138 produces multiple $XY_d$ when bit $Y_d$ is equal to logic 1. The connections continue in a similar fashion until a first input of AND gate 140 receives multiplicand X, and a second input receives the second least significant bit of the multiplier which is labeled $Y_1$. The output of AND gate 140 produces multiple $XY_1$ when bit $Y_1$ is equal to logic 1. A first input of AND gate 142 receives multiplicand X, and a second input receives the least significant bit of the multiplier which is labeled $Y_0$. The output of AND gate 142 produces multiple $XY_0$ when bit $Y_0$ is equal to logic 1.

The interim result produced by arithmetic unit 14 is in the form of an unsigned redundant binary number. The need for a redundant representation arises from the fact that the more significant digits already produced become subject to change when a carry is produced by operations on a later or less significant digit pair. The approach described herein originated from noting: (a) that the results already obtained during on-the-fly averaging of two numbers are not subject to change because there are no carries, and (b) that the sum of two numbers is twice their average. The average of two numbers such as $X = 11101011,$ and $Y = 11000101,$ can be written as $Av = 11\tfrac{1}{2}0\tfrac{1}{2}\tfrac{1}{2}1.$ No carries occur at any point in the generation of the sequence as the bit pairs arrive, but the issue now is how to represent the digits. This can be done by decomposing the Av sequence into two streams, (one for half-integer values and one for the integers), but this merely converts the addition of the two input bit streams X and Y, into the addition of two output bit streams.

Because the numbers 0 through 3 can also be represented by two bits, we can treat the addition of three bit streams in much the same way, thereby achieving a reduction from three bit streams down to two during the addition process.

We consider the addition of three numbers, X, Y, and Z, each of which is represented by a MSB to LSB bit stream of length K. The value of one such word, X, after k bits have been received ($k \leq K$) is $$X(k) = \sum_{n=1}^{k} 2^{k-n} x_n,$$

with similar expressions for Y and Z. After k bits have been received, the sum of the three bit streams is $$W(k) = \sum_{n=1}^{k} 2^{k-n} w_n = \sum_{n=1}^{k} 2^{k-n}(x_n + y_n + z_n). \quad \text{(EQ. 1)}$$

The increase in W(k) over its equivalent previous value is $W(k) - 2W(k-1) = x_k + y_k + z_K = w_k.$ Whenever $x_k + y_k + z_k$ has a value greater than 1, a carry is generated which requires changes in the previous bits of a conventional binary output. However, for an on-the-fly process, these bits have already been output.

To avoid this problem, we decompose $w_n$ (which can have the values 0, 1, 2, or 3) into two bit streams, according to $w_n = s_n + 2r_n,$ where $r_n$ and $s_n$ each have allowed values of only 0 and 1, and are given by the truth table of FIG. 9. It is clear that s, and r are basically the 'sum' and 'carry' bits of binary addition:

$s_n = (x_n \oplus y_n) \oplus z_n$ and $r_n = (x_n \oplus y_n) \cdot z_n) + (x_n \cdot y_n),$ where $\cdot$, $+$, and $\oplus$ represent the Boolean operations of 'AND', 'OR', and 'EXCLUSIVE OR', respectively. Eq. 1 becomes $$W(k) = 2 \sum_{n=1}^{k} 2^{k-n}(r_n + \tfrac{1}{2} s_n). \quad \text{(EQ. 2)}$$

If we write $$R(k) = \sum_{n=1}^{k} 2^{k-n} r_n,$$

with a similar expression for S(k), and note that $s_0$ is set to zero, we can readily show that $W(k) = 2(R(k) + S(k-1)). \quad \text{(EQ. 3)}$ The final result is obtained after $K + 1$ cycles:

$X(K) + Y(K) + Z(K) = W(K+1) = 2R(K) + S(K),$ since $r_{k+1} = 0$.

Referring to FIG. 5, this operation can be readily implemented by a three input adder which consists of D flip-flop 72 and a one bit adder. The D flip-flop takes account of the factor $\tfrac{1}{2}$ in Eq. 2, i.e., it aligns the S and R bit streams according to Eq. 3. Because of this, the three input adder can add on-the-fly three words of any length which are in conventional MSB to LSB bit serial form. In addition, two of the inputs can be used for the R and S bit streams which form the redundant representation of a number, while the third is used for a conventional bit stream.

The result obtained from these arithmetic operations will be in an unsigned redundant representation given by the S and R bit streams. This redundant representation can be decoded or converted, on-the-fly, into a conventional binary bit stream or parallel binary word. This can be accomplished by the following method.

Referring back to FIG. 6, we consider the addition of the final pair of bit streams (S, R) using the first stage of decoder 16. The output bits are $$s'_n = r_{n-1} \oplus s_{n-1} \quad (EQ. 4)$$

$$r'_n = r_n \cdot s_n \quad (EQ. 5)$$

We see from Eq. 4 that $S_1 = 0$ since $r_0 = s_0 = 0$. After m sequential operations, $s'_n = 0$ for $n = 1, \ldots, m$. Furthermore, we see from Eq. 5 that $r'_n = 0$ if $s_n = 0$. The end result of this is that K such operations on the S and R bit streams of length K, will reduce the R stream to a string of zeros, thus completing the decoding process. Therefore, the decoder can consist of a series of half adders, each followed by a D flip-flop in the S line.

As a brief example of the addition algorithm, the redundant representation, and the decoding of this representation, we consider the addition of two 8 bit numbers, both in the two stream representation.

we take

A = 10101010, and

B = 01011011, where we have used the following notation for redundant forms:
1. S is given by the 1's and 0's,
2. R has a 1 at each underlined bit position, with 0's elsewhere.

Thus, the decoded result for A and B is

A = 11101111,

B = 10100100.

The calculation proceeds as follows:

| | | | | | | | | | |
|---|---|---|---|---|---|---|---|---|---|
| First input | $s_A$ | 1 | 0 | 1 | 0 | 1 | 0 | 1 | 0 |
| | $s_B$ | 0 | 1 | 0 | 1 | 1 | 0 | 1 | 1 |
| | $r_B$ | 0 | 1 | 0 | 0 | 1 | 0 | 0 | 1 |
| From truth-table | $s_{n+1}$ | 1 | 0 | 1 | 1 | 1 | 0 | 0 | 0 |
| | $r_n$ | 0 | 1 | 0 | 0 | 1 | 0 | 1 | 1 |
| First output | $s_n$ | | 1 | 0 | 1 | 1 | 1 | 0 | 0 | 0 |
| | $r_n$ | 0 | 1 | 0 | 0 | 1 | 0 | 1 | 1 |
| Delayed input | $r_A$ | 0 | 1 | 0 | 0 | 0 | 1 | 0 | 1 |
| From truth-table | $s_{n+1}$ | 0 | 1 | 1 | 0 | 1 | 0 | 1 | 1 |
| | $r_n$ | 1 | 0 | 0 | 1 | 0 | 1 | 0 | 0 |
| Second output | $s_n$ | | 0 | 1 | 1 | 0 | 1 | 0 | 1 | 1 |
| | $r_n$ | 1 | 0 | 0 | 1 | 0 | 1 | 0 | 0 |
| Result | | 0 | 0 | 1 | 1 | 0 | 1 | 0 | 1 | 1 |

The decoding proceeds via the smaller truth table formed by just the top half of FIG. 9:

| | | | | | | | | | |
|---|---|---|---|---|---|---|---|---|---|
| From first stage | $s_{n+1}$ | 1 | 0 | 1 | 0 | 0 | 0 | 0 | 1 | 1 |
| | r | 0 | 0 | 0 | 1 | 0 | 1 | 0 | 0 | 0 |
| Result | | 1 | 0 | 1 | 0 | 0 | 0 | 0 | 1 | 1 |
| From second stage | $s_{n+1}$ | 1 | 0 | 0 | 0 | 1 | 0 | 0 | 1 | 1 |
| | r | 0 | 0 | 1 | 0 | 0 | 0 | 0 | 0 | 0 |
| Result | | 1 | 0 | 0 | 0 | 1 | 0 | 0 | 1 | 1 |
| From third stage | $s_{n+1}$ | 1 | 1 | 0 | 0 | 1 | 0 | 0 | 1 | 1 |
| | r | 0 | 0 | 0 | 0 | 0 | 0 | 0 | 0 | 0 |

In this example, only the first three stages of the decoder are needed to decode the redundant representation into a conventional binary number. However, there are cases where all of the stages are needed before the redundantly coded number is fully converted.

I claim:

1. An apparatus for multiplying a first input binary number by a second input binary number, comprising:
   (a) generating means for serially generating in response to the second input binary number, a plurality of multiples of the first input binary number, said multiples being in the form of serial binary numbers;
   (b) arithmetic means for serially adding, from a most significant bit to a least significant bit, said plurality of multiples to produce a first unsigned redundant binary number represented by a first and a second output serial binary number; and
   (c) decoding means for serially converting, from a most significant bit to a least significant bit, said first unsigned redundant binary number into a conventional binary number.

2. The apparatus of claim 1, wherein said arithmetic means comprises:
   first adding means for serially adding, from a most significant bit to a least significant bit, a first plurality of serial binary numbers to produce a third and a fourth output serial binary number;
   second adding means for serially adding, from a most significant bit to a least significant bit, a second plurality of serial binary numbers to produce a fifth and a sixth output serial binary number; and
   third adding means for serially adding, from a most significant bit to a least significant bit, said third, said fourth, said fifth, and said sixth output serial binary numbers to produce said first unsigned redundant binary number.

3. The apparatus of claim 2, wherein each of said adding means comprises:
   first three input adding means for serially adding a first, a second, and a third serial binary number to produce a fourth and a fifth serial binary number;
   adding delay means for delaying a sixth serial binary number; and
   second three input adding means for serially adding a result produced by said adding delay means, said fourth serial binary number, and said fifth serial binary number to produce two output serial binary numbers.

4. The apparatus of claim 3, wherein said first three input adding means comprises:
   first three input adding logic means for detecting when the sum of corresponding bits from said first, said second, and said third serial binary number equals an odd number;
   three input adding delay means for delaying a result produced by said first three input adding logic means; and
   second three input adding logic means for detecting when corresponding bits from at least two of said first, said second, and said third serial binary numbers equal logic one.

5. The apparatus of claim 2, wherein said generating means comprises: first logic means for serially ANDing the first input binary number with a most significant bit of the second input binary number;

delay means for delaying the first input binary number; and second logic means for serially ANDing an output produced by said delay means with a next most significant bit of the second input binary number.

6. The apparatus of claim 2, wherein said decoding means comprises:

first decoding logic means for EXCLUSIVE ORing corresponding bits from said first and said second output serial binary numbers;

decoding delay means for delaying a result produced by said first decoding logic means; and second decoding logic means for ANDing corresponding bits from said first and said second output serial binary numbers.

7. The apparatus of claim 1, wherein said arithmetic means comprises:

first adding means for serially adding, from a most significant bit to a least significant bit, a plurality of serial binary numbers and a first multiple to produce a third and a fourth output serial binary number; and second adding means for serially adding, from a most significant bit to a least significant bit, said third and said fourth output serial binary numbers and a second multiple to produce said first unsigned redundant number.

8. The apparatus of claim 7, wherein said generating means comprises:

first logic means for serially ANDing the first input binary number with a most significant bit of the second input binary number; and second logic means for serially ANDing the first input binary number with a next most significant bit of the second input binary number.

9. The apparatus of claim 8, wherein each of said adding means comprises:

first adding logic means for detecting when the sum of corresponding bits from a first, a second, and a third serial binary number equals an odd number;

adding delay means for delaying a result produced by said first adding logic means; and second adding logic means for detecting when corresponding bits from at least two of said first, said second, and said third serial binary numbers equal logic one.

10. The apparatus of claim 7, wherein said decoding means comprises:

first decoding logic means for EXCLUSIVE ORing corresponding bits from said first and said second output serial binary numbers;

decoding delay means for delaying a result produced by said first decoding logic means; and second decoding logic means for ANDing corresponding bits from said first and said second output serial binary numbers.

11. The apparatus of claim 10, wherein said generating means comprises:

first logic means for serially ANDing the first input binary number with a most significant bit of the second input binary number; and second logic means for serially ANDing the first input binary number with a next most significant bit of the second input binary number.

12. The apparatus of claim 7, wherein each of said adding means comprises:

first adding logic means for detecting when the sum of corresponding bits from a first, a second, and a third serial binary number equals an odd number;

adding delay means for delaying a result produced by said first adding logic means; and second adding logic means for detecting when corresponding bits from at least two of said first, said second, and said third serial binary numbers equal logic one.

13. An apparatus for multiplying a first input binary number by a second input binary number, comprising:

(a) first logic means for serially ANDing the first input binary number with a most significant bit of the second input binary number to produce a first multiple, said first multiple being in the form of a serial binary number;

(b) delay means for delaying the first input binary number;

(c) second logic means for serially ANDing an output produced by said delay means with a next most significant bit of the second input binary number to produce a second multiple, said second multiple being in the form of a serial binary number;

(d) first adding means for serially adding, from a most significant bit to a least significant bit, a first plurality of serial binary numbers to produce a first and a second output serial binary number;

(e) second adding means for serially adding, from a most significant bit to a least significant bit, a second plurality of serial binary numbers to produce a third and a fourth output serial binary number;

(f) third adding means for serially adding, from a most significant bit to a least significant bit, said first, said second, said third, and said fourth output serial binary numbers to produce a first unsigned redundant binary number represented by a fifth and a sixth output serial binary number;

(g) first decoding logic means for EXCLUSIVE ORing corresponding bits from said fifth and said sixth output serial binary numbers;

(h) decoding delay means for delaying a result produced by said first decoding logic means; and (i) second decoding logic means for ANDing corresponding bits from said fifth and said sixth output serial binary numbers.

* * * * *